July 11, 1961

W. H. GRACE 2,992,374

SERVOSYSTEM AND RELAY CIRCUIT

Filed April 23, 1959

| FIG. 1a | FIG. 1b |
|---------|---------|
|         | FIG. 1c |

WILLIAM H. GRACE,
INVENTOR.

BY *W. E. Beatty*

ATTORNEY.

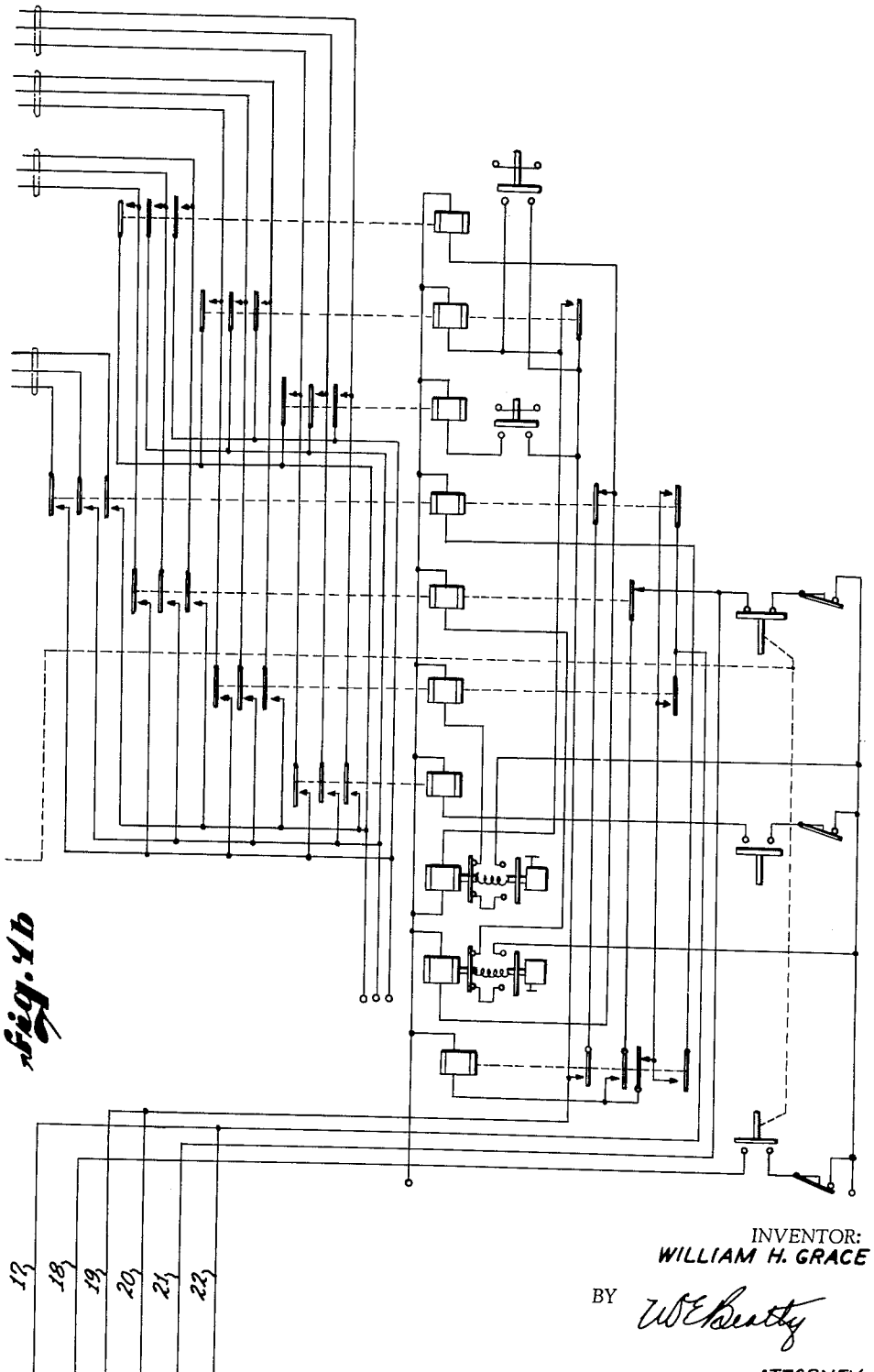

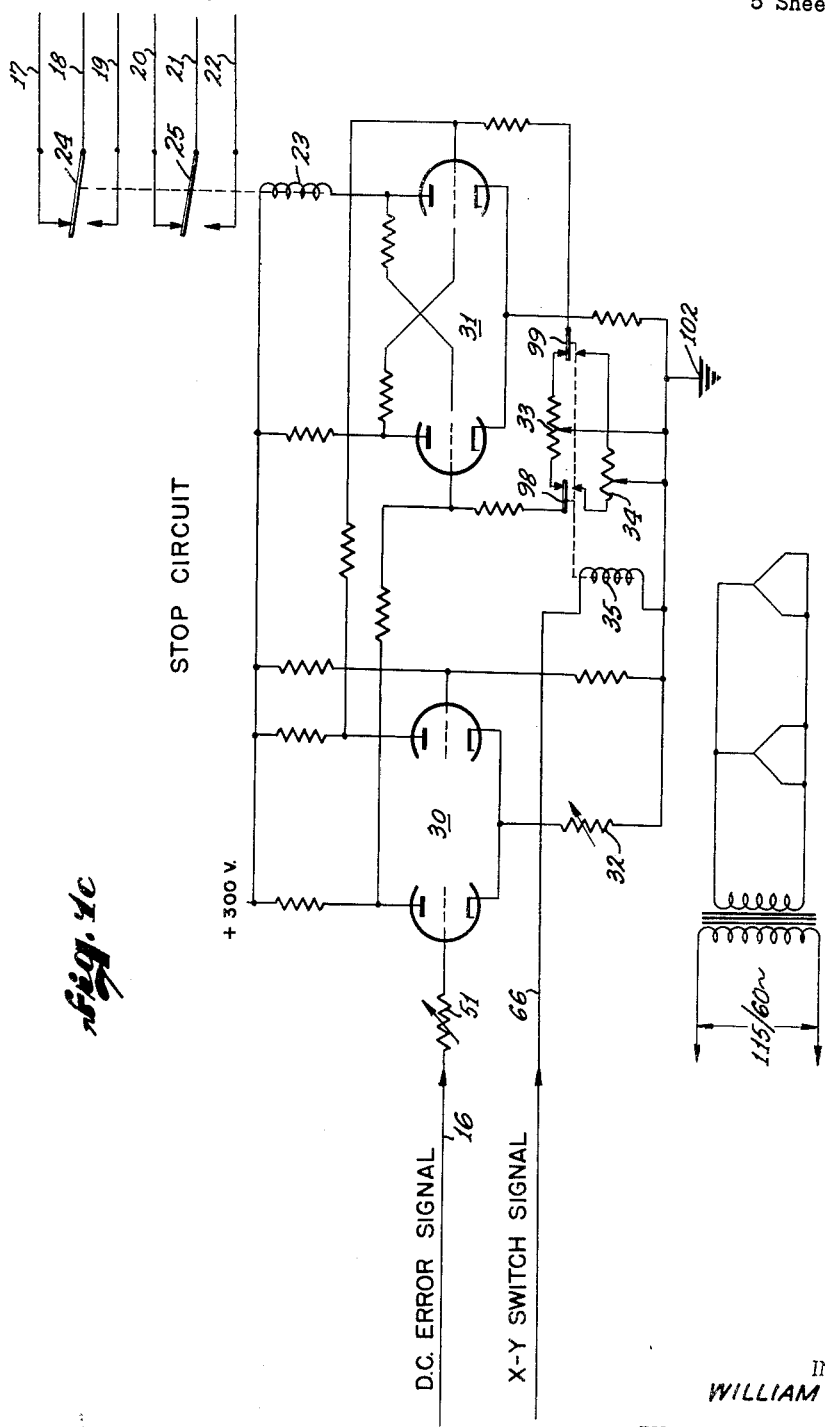

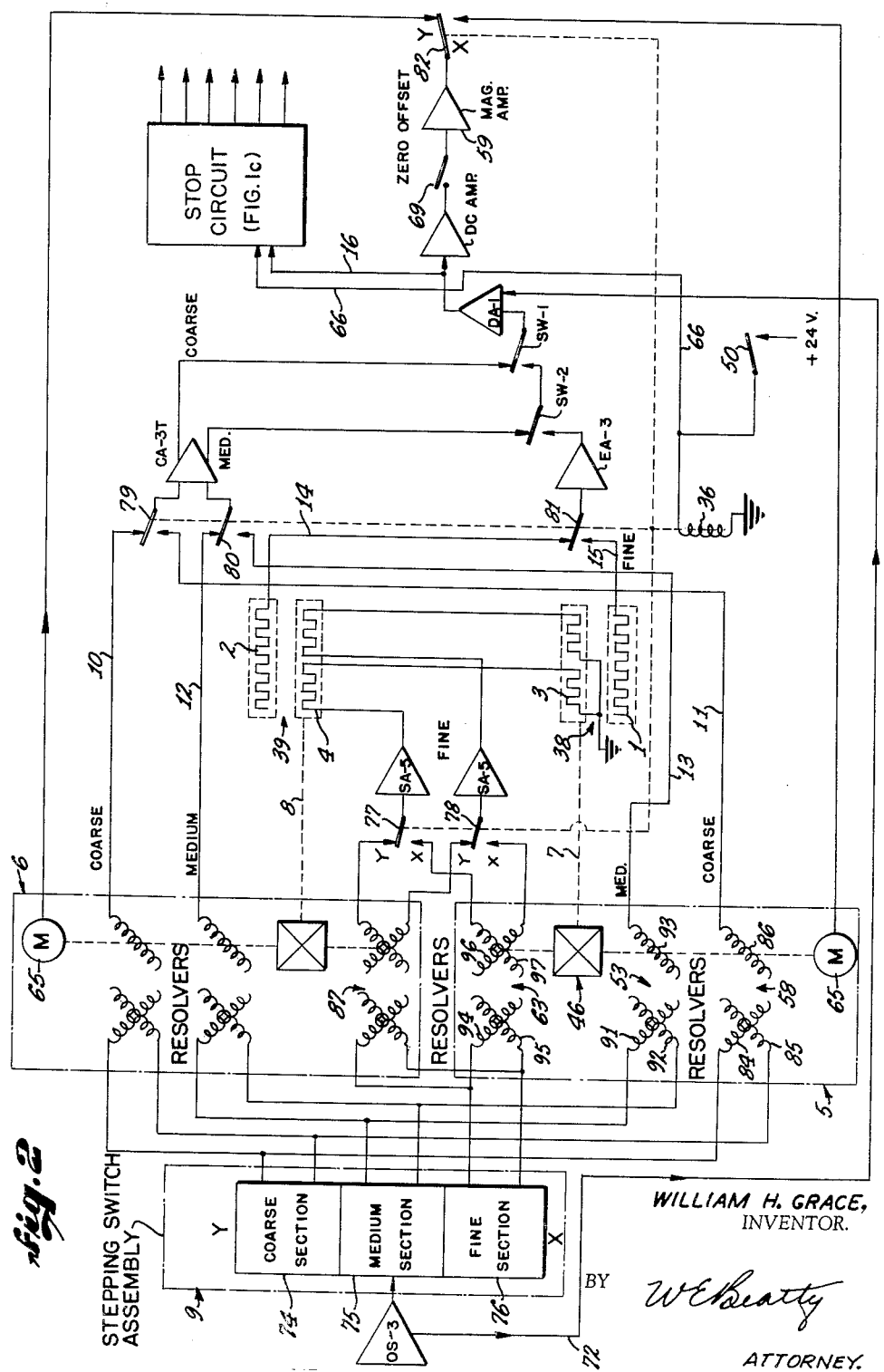

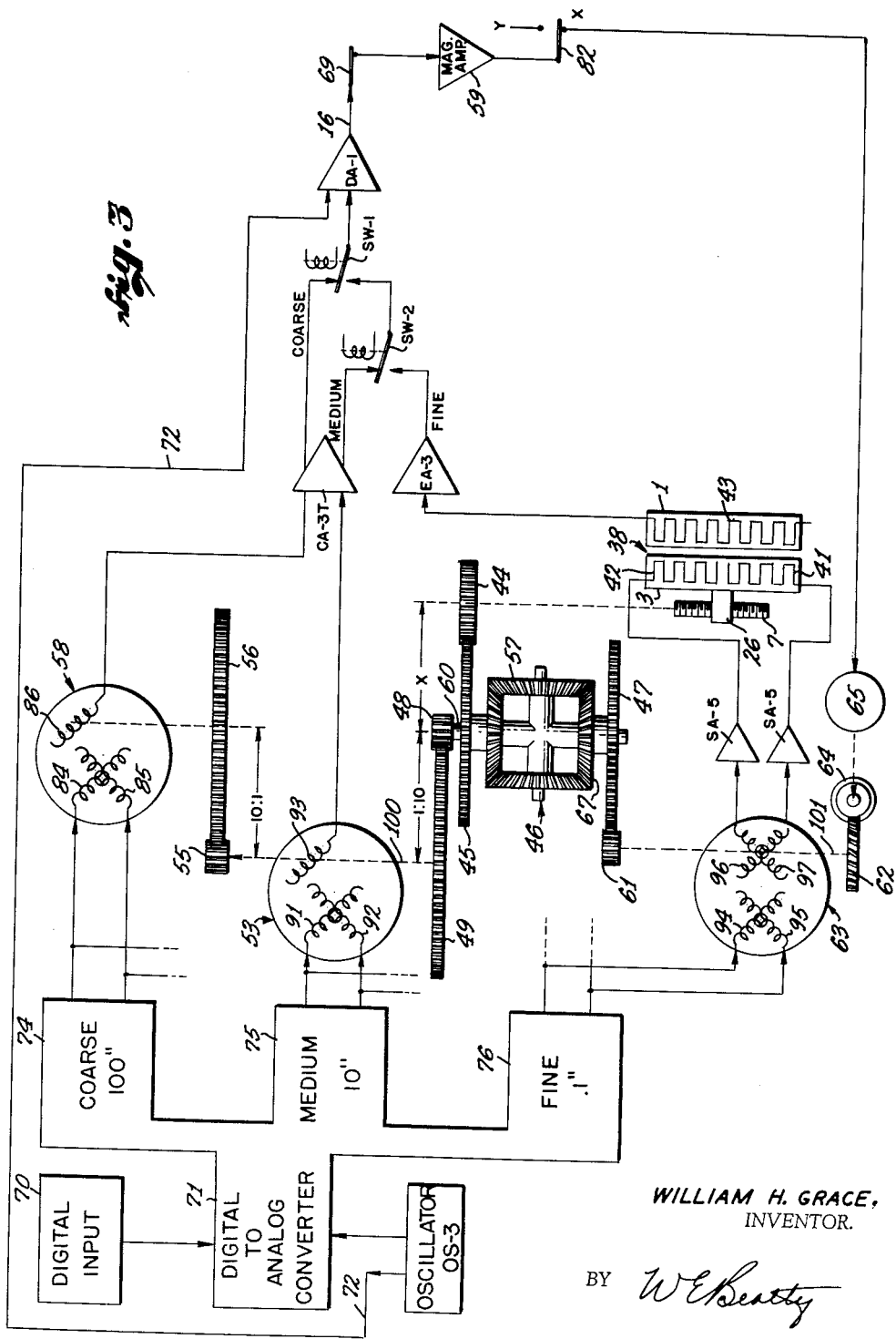

United States Patent Office 2,992,374
Patented July 11, 1961

2,992,374
SERVOSYSTEM AND RELAY CIRCUIT
William Henry Grace, Thornwood, N.Y., assignor to Inductosyn Corporation, Carson City, Nev., a corporation of Nevada
Filed Apr. 23, 1959, Ser. No. 808,445
4 Claims. (Cl. 318—28)

The invention relates to a relay circuit and more particularly to a circuit wherein an input signal is amplified for operating a relay. More particularly, the invention relates to means for varying the value of the input potential which causes the relay to operate, and also to means for varying the difference between the input voltage which causes the relay to operate and the input which causes the relay to release.

The relay of the present invention is particularly useful for controlling a machine, particularly for controlling the precise point at which a driven machine element will stop.

In the patent to De Vlieg et al., 2,561,346, a machine tool positioning system is disclosed wherein the desired position of the machine is obtained by a limit switch operated by measuring rods which are inserted along the ways in various length combinations to make up the desired dimension.

The limit switch provides an electrical signal, when it is contacted by the rods, which indicates the point where the machine should stop. Each time the machine passes the line of zero positioning, the limit switch is alternately energized and de-energized, operating various relays and timers in the control panel to cause the machine to follow its stopping cycle.

De Vlieg over-runs the desired position twice, first in one direction then in the opposite. It is not until the third pass that the machine is stopped, by clamps, when it is moving very slowly. Even at that time, the motor is again reversed, with the slide clamped in place, for the short period of time necessary for the motor to rotate an amount equivalent to half the measured backlash of the driving mechanism.

The four basic steps of De Vlieg et al. are as follows:

*Slow rapid approach.*—The machine moves at its top speed—60 inches per minute—until the rods contact the limit switch, causing the controls to order the next step.

*Fast feed back.*—The machine reverses direction at a speed of 1.8 inches per minute. Having over-run the zero position, due to the time required to slow down and reverse direction, it again approaches the zero position, but from the opposite direction. When this point is reached, it relaxes the limit switch, causing the controls to order the next step.

*Slow feed in.*—The machine again reverses direction and slows down to .5 inches per minute. It has again over-run the zero position and must approach it from its original direction, until the limit switch is contacted a second time. The clamps are energized at this point, holding the slide securely in place with no over-run, due to the slow speed of approach. The controls also require the machine to go into the next step.

*Relaxation.*—The motor reverses for the third time, and rotates a predetermined length of time necessary so that the angle of rotation of the motor when finally stopped is equal to one-half the total backlash of the drive. This removes any tension on the slide that might have existed due to elasticity of the driving mechanisms.

Some disadvantages of the De Vlieg system are that the automatic positioning cannot be reversed as the slide must always start on the same side of the desired position, and no means is provided for zero-offset, that is for introducing a differential between the data elements and the machine in order to offset the machine co-ordinate zero from the workpiece co-ordinate zero.

Objects of the present invention are to overcome the above disadvantages and provide a relay circuit wherein the machine position produces an electrical signal with a data element such as the highly accurate Inductosyn [1] (Patent 2,799,835, July 16, 1957), instead of the measuring rods of De Vlieg et al.

A further object is to provide a relay circuit which is useful in substitution for the previous limit switch.

Further objects are to provide for reversing the direction of approach and to provide for inserting + or − dimensions from a zero reference position.

A further object is to provide a relay circuit wherein one set of electronics and an output relay controlled thereby are provided with a relay control for either one of two axes, whereby the input command data as modified by the zero-offset, as pertaining to one axis may form an input to the relay circuit to control the output relay to stop the machine as desired, or the control may be shifted as pertains to the other axis of the machine, the relay circuit thus serving in the control for each axis. The zero-offset feature referred to above is described and claimed in co-pending application S.N. 638,722, filed February 7, 1957, by Robert W. Tripp for "Zero Off-Set for Machine Tool Control."

For further details reference may be made to the drawings wherein FIG. 1 is a block diagram showing how FIGS. 1a, 1b and 1c fit together.

FIG. 1a is a perspective view of the machine as illustrated in the corresponding figure of the patent to De Vlieg et al., modified in accordance with the present invention to employ Inductosyn type data elements instead of measuring rods.

FIG. 1b corresponds somewhat to the corresponding figure in the De Vlieg patent, in providing the same relay arrangement for controlling the application of 3-phase power to the high or low windings of the motors of FIG. 1a. The difference is that the four vertical lines at the left of FIG. 1b instead of leading to two limit switches, one for each axis, lead to a single set of contacts at the upper right portion of FIG. 1c which illustrates the improved stop circuit or relay circuit of the present invention.

FIG. 2 illustrates the input data control circuit, including zero offset control for each of two co-ordinate axes X and Y, as an input for the stop circuit of FIG. 1c.

FIG. 3 is a schematic showing of further details of the zero-offset control for the X axis of FIG. 2.

Figures 4, 4A:
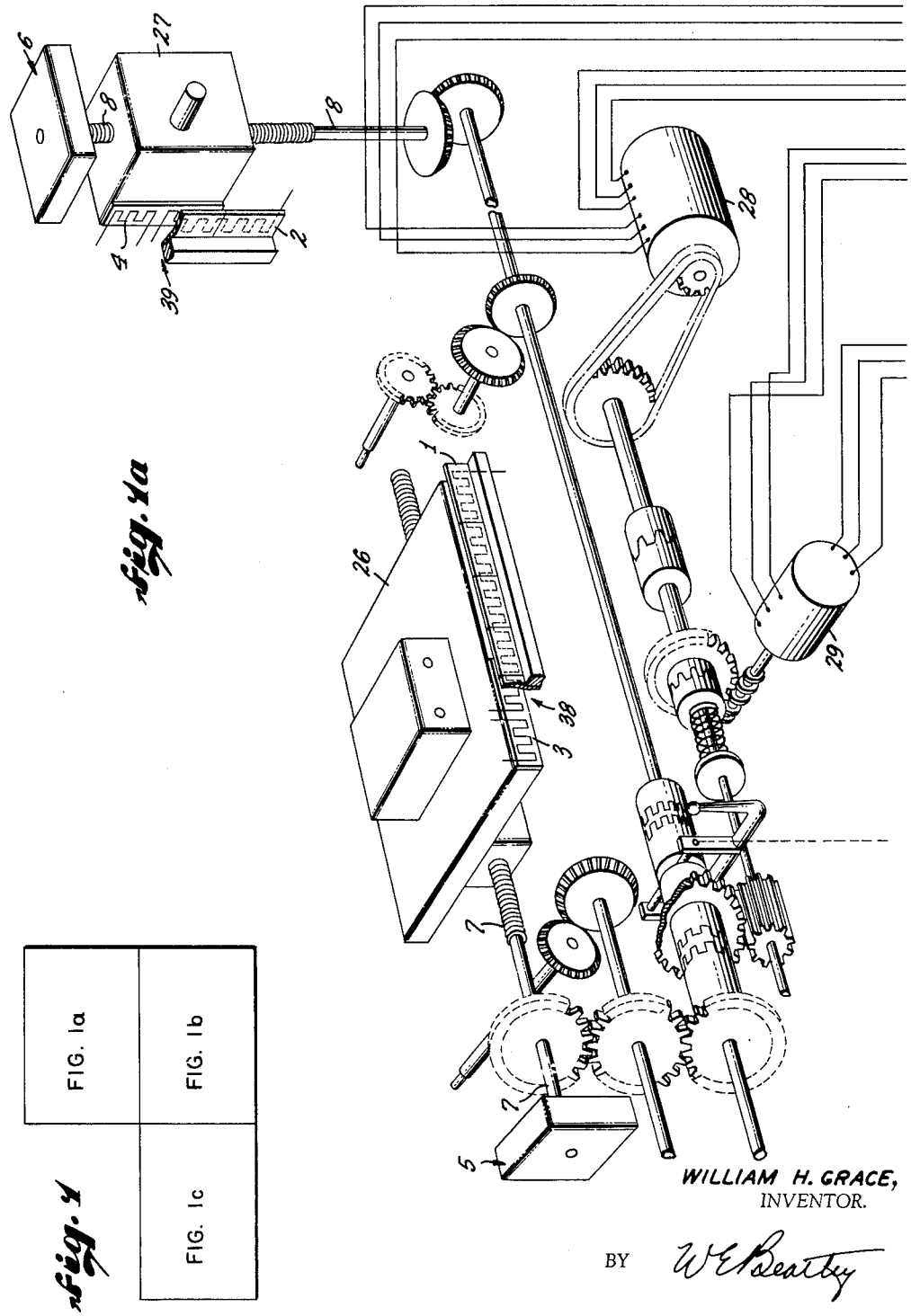

Referring in detail to the drawings, as previously stated, the machine of FIG. 1a is substantially the same as that in the patent to De Vlieg et al. previously mentioned, except that in place of the measuring rod control, there is provided an electrical control. Accordingly, for the horizontal or X axis, the slide 26 has affixed thereto the slider 3 of an Inductosyn 38 having a cooperating stationary scale member 1. For the vertical or Y axis, the slide 27 has affixed thereto the slider 4 of an Inductosyn 39 having a cooperating stationary scale 2. The Inductosyns 38 and 39 constitute the fine data elements of the input system and are also illustrated in FIG. 2.

Referring to FIG. 1a, the slide 26 is operated by the lead screw or shaft 7 which has been modified by adding thereto the data offset unit 5, also indicated in the block marked 5 in FIG. 2. In FIG. 1a, the vertical lead screw or shaft 8 also has been similarly modified by the addition of the data offset unit 6, also indicated in the block marked 6 in FIG. 2.

In general, the circuit of FIG. 2 comprises means for producing a D.C. error signal proportional to the distance error of slide 26 or 27. This error signal appears on the

[1] Trademark.

line 16 in FIGS. 2 and 1c and is used to trigger the relay or stop circuit of FIG. 1c, to operate the output relay 23, FIG. 1c. The armatures 24, 25 of relay 23 control lines 17 to 22 connected to the De Vlieg circuit as shown in the patent and in FIG. 1b. Positional commands are generated in the coarse, medium and fine sections of the stepping switch assembly 9, and excite the resolvers in the data zero-offset units 5 and 6 and Inductosyns 38 and 39, those resolvers having windings and the Inductosyns having sliders 3 and 4 which are mounted to the machine, as indicated in FIG. 1a. Coarse, medium and fine error signals on lines 10, 11, 12, 13, 14 and 15 proceed through switches and electronic units to develop the D.C. error signal on line 16. The manner in which this is accomplished, together with a brief description of the installation of the Inductosyn and the zero-offset will now be given.

INSTALLATION OF INDUCTOSYN

Scale

The stationary member 1, 2 of the linear fine data transformer 38, 39 is referred to as a scale, the movable member 3, 4 being referred to as a slider.

It is assumed that a suitable flat surface is provided on the machine tool bed for the mounting of the scale and that this surface is provided with a raised step, or bar, parallel to the direction of motion of the slider for aligning the scale. The scale is mounted on the bed with its metal bars on the top face. The scale is secured to the bed at its center by a clamping screw through the drilled hole and also at its center by an edge clamp pressing against the bevel. The scale is positioned by pressing the scale by means of the edge clamp toward the aligning bar so it contacts securely with it and then clamping the edge clamp screw and the central scale clamping screw. These two screws are first to be coated with Glyptal No. EC-1309 so that a very slight amount adheres to the glass at the edge of the hole and at the edge of the clamp. The Glyptal will prevent the screws from coming loose. After the Glyptal hardens, the screw can be removed with moderate force by a screw driver.

Slider

The slider is mounted with its silver bars facing the silver bars of the scale and spaced therefrom a distance of from .005" to .010". The slider is attached to the moving carriage by means of a clamping screw and two edge clamps (the two edge clamps may be omitted if desired). The screws are secured in place with Glyptal the same manner as the screws for the scale.

Additional scales

After the first scale is positioned on the machine, the next scale is set adjacent to it and separated from it approximately .004". Before finally clamping this scale into place the carriage should be moved so that the slider covers equal amounts of the ends of the two scales. A vacuum tube voltmeter or other null indicator is used. The carriage is brought to null with respect to the first scale. The first scale is disconnected. The second scale is connected and, without having moved the carriage, the second scale is adjusted to null. The two scales are then in proper relation to each other.

Zero offset

Differentials are introduced between the data elements and the machine, with provisions for setting these differentials to the desired offset values. As illustrated, an electrical differential is used with the linear fine data element, a mechanical differential being provided for the medium and coarse data elements.

FIG. 3 pertains only to one axis of the machine which may be referred to as the X axis, an additional axis Y for two-dimensional operation, involving the use of apparatus substantially the same as that shown in FIG. 3 for such additional axis.

As shown in FIG. 3, the positional command is indicated as a digital input 70, and a digital-to-analog converter therefor 71, although other types of inputs may be employed. The phase sensitive amplifier DA-1 is energized over line 72 by oscillator OS-3 which also energizes the converter 71. The digital-to-analog converter has as outputs coarse, medium and fine increments represented at 74, 75 and 76 of the input data, each of which supplies sine and corresponding cosine values of the angle corresponding to the required operation of the coarse resolver 58, the medium resolver 53 and the slider 3 of the linear position measuring transformer 38 which has a stationary scale 1 as described above. The lead screw 7 of the machine drives the nut or slide 26 to which is fixed the slider 3 carrying windings 41 and 42 arranged in space quadrature of the pole cycle of the single conductor winding 43 on the scale 1. The nut or slide 26 represents the carriage or driven element of the machine which is to be positioned in accordance with the positional command of the digital input 70 or other input.

Resolver 58 has stationary space quadrature windings 84 and 85 to which are supplied currents corresponding to the sine and cosine of the angle to which the rotatable winding 86 will be driven by the lead screw 7, to null the servo motors 28 and 29 which correspond respectively to motors 13 and 14 in FIG. 1 of the patent to De Vlieg et al.

The medium resolver 53 similarly has stationary space quadrature windings 92 and 93 and a rotatable winding 93 wherein the current is null when the winding 93 is rotated to the angle designated by the input, being sine and cosine currents of that angle.

In the case of the coarse resolver 58 and the medium resolver 53, the zero offset is added in mechanically, by rotating the rotary winding 96 of the former and the rotatable winding 93 of the latter by the amount selected for the zero offset. For this reason, the sine and cosine currents are led directly to the resolvers 58 and 53, while in the case of the fine position measuring transformer 38, the zero offset is added in electrically by the resolver 63, whereby the zero offset motor 65 is available to rotate the resolvers 63, 53 and 58, in proportion to their scale factors and as required for the zero offset.

The sine and cosine currents of the fine increment of the input are supplied to the stationary windings 94 and 85, the rotatable windings 96 and 97 supplying corresponding sine and cosine currents of the angle required by the fine increment 76, but of modified space phase depending on the zero offset angular adjustment thereof by the zero offset motor 65. The windings 96 and 97 are connected through suitable amplifiers indicated at SA-5 to the space quadrature windings 41 and 42 of the slider 3.

The gearing between the lead screw 7 and the coarse, medium and fine data elements 58, 53 and 38 and the pole pitch of the windings on the fine data element 38 may be such that the scale factors of the coarse, medium and fine data elements are as indicated in FIG. 3, namely 100 in. to 10 in. to .1 in., one revolution of each of the coarse, medium and fine data resolvers 58, 53 and 63 corresponding to the above mentioned respective travels of the nut or slide 26, namely 100 in., 10 in., .1 in. respectively.

The position of lead screw 7 is transmitted to the medium resolver 53 through suitable gears schematically indicated at 44, 45, 48 and 49. The position of lead screw 7 is transmitted to the coarse resolver 58 from shaft 100 through gears 55 and 56.

The cage 57 of differential 46 is connected directly to gear 48, which in turn meshes with the medium resolver shaft 100 at a 10:1 ratio. Gear 48, on the spider 57, is the output gear of the differential 46, and this output is proportional to the sum, or difference of two inputs, one of which is from the machine via gear 45 which is fixed to bevel gear 68, the other input being via the zero offset motor 65, shaft 101 and gear 61 meshing with gear 47 fixed to bevel gear 67. Gear 48 thus has an output proportional to the sum or difference of its two inputs, the spider 57 having a scale value per revolution twice that of either end gear as described in S.N. 638,722.

Suitable rotation of gear 47, acting through differential 46, will position or offset the shaft 100 of resolver 53 as desired with respect to the lead screw 7. Since the coarse resolver 58 is permanently geared to the medium resolver 53 through suitable gears indicated at 55 and 56, the correct relative positions will be maintained of resolver 53 and 58 in accordance with their 10 to 1 scale factors as shown.

The magnetic amplifier 59 is in circuit with the A.C. zero offset motor 65.

Gear 47 is driven by offset motor 65 through a non-reversible pair of gears 64 and 62, shaft 101 (for the rotary windings 96 and 97) and gear 61. Resolver 63 is an electrical differential in series with the fine data element 38 and is arranged to rotate once for each 0.1 in. advance of the machine, i.e., nut or slide 26.

The rotation of gear 47 does not work back through the differential 46 to operate the lead screw 7, since the frictional load on the lead screw 7 is large compared to the load imposed by the coarse and medium resolvers 58 and 53 and the gear train which drives them.

In FIG. 3, the gear ratio between the lead screw 7 and the shaft 60 of cage 57 is indicated as "x," as various leads may be obtained by selecting any desired ratio for "x."

For normal operation, the switch 69 is moved to its open position, the D.C. error current from amplifier DA–1 leading from the coarse, medium and fine data elements 58, 53 and 38 are supplied over line 16 to the stop circuit FIG. 1c to operate the servo motors 28 and 29 which drive these data elements to a null position corresponding to the positional command of the input 70.

The error current from resolvers 58 and 53 is supplied to amplifiers CA–3T, the error current from the fine data element 38 being supplied to amplifier EA–3. When the coarse error current is reduced to a value which can be handled by the medium and/or fine data elements, the switch SW–1 connects in the switch SW–2 which likewise switches off the medium error current when the error current is reduced to a value which can be handled by the fine data element. These error currents as shown are supplied to the phase sensitive amplifier DA–1.

When it is desired to offset the machine coordinates with respect to the program zero of the input 70, the switch 69 is moved to the position shown. Having initially zeroed the resolvers 58, 53 and 63 for any position, the zero offset is set in as follows:

(1) Position the workpiece on the machine at the desired location with respect to the spindle or tool.
(2) With main drive off, insert the command in the input 70 corresponding to this position of the work.
(3) Move switch 69 to position shown in FIG. 3 to connect motor 65 into the servo system in place of the servo drive motors 28 and 29.
(4) Allow motor 65 to drive nut or slide 26 to a position of zero eror.

The zero offset is now set.

All three error signals operate at so called different "speeds" or under control of switches SW–1 and SW–2, which are similar to switch 125 in FIG. 16, Patent 2,875,-390 referred to later, also see page 84, vol. 25 of "Radiation Laboratory Series," "Theory of Servo-Mechanisms," by James et al., published 1947 by McGraw-Hill Book Co. Pages 81–88 define "speed" and disclose a "synchronizing" circuit for dual-speed which may be used here.

Patent 2,839,711, issued June 17, 1958, to R. W. Tripp for "Automatic Shaft Control" discloses and claims a computer for computing the sine and cosine values of an angle equal to the sum of the angles represented by the digits in decimally related digital groups which may be used in input 70. Said patent discloses and claims the feature of producing the co-function sine and cosine values of the angle in coarse and fine increments.

Patent 2,875,390, issued February 24, 1959, to R. W. Tripp, for Automatic Machine Control System, discloses and claims (a) a feed rate resolver for resolving the combined analog value of the various path elements into space quadrature drives for the machine X and Y elements, by using these analog values to control the shaft of a resolver having co-function outputs in the relation of sine and cosine, the latter being integrated with the feed rate for controlling the speed ratio of the X and Y machine drives, and (b) the item a together with a zero offset or an adjustable zero reference for the origin or reference position with respect to the X and Y orthogonal axes along which machine drives are relatively driven to obtain a cutting path referenced to such axes, whereby the position of each axis for the machine drive may be referred to any selected origin of coordinates, either within the machine or outside of it.

*Input data control circuit*

Referring to FIG. 2, when switch 50 is closed, this supplies current to the coil of a control relay 36, to actuate all of the armatures associated with it by a broken line to an atlernate position, these armatures including the ones indicated at 77, 78 which control connection of the fine resolvers 63 and 87 to SA–5 amplifiers, armatures 79, 80 and 81 which control connection of the coarse, medium and fine signals to amplifiers CA–3T and EA–3, and armature 82 which controls the connection of a magnetic amplifier 59 to the motors like 65 in the blocks 5 and 6. With armatures 77 to 82 in the position shown, the circuit of FIG. 2 is active with regard to the circuit components pertaining to axis Y, while with the relay 36 actuated, when switch 50 is closed, to move armatures 77 to 82 to their alternate positions, the circuit of FIG. 2 is conditioned with respect to axis X, noting that the block 6 in FIG. 2 pertains to axis Y while the block 5 pertains to axis X. Thus, the zero offset control may be applied to either axis X or axis Y and depending upon whether switch 50 is closed or not, the line 16 supplies an error signal pertinent to one axis of the machine or the other.

When switch 50 is closed, this also operates relay 35, FIG. 1c over line 66, relays 35 and 36 being in parallel circuits.

As applied to each axis, it can be seen that information flows from coarse, medium and fine stepping switch assembly 9, through the data zero-offset unit 5, 6 and the Inductosyns 38, 39, through the amplifier assembly CA–3T, EA–3 and DA–1, to the stop circuit via line 16 or to the zero-offset servo amplifier 59. These controls set up the desired position electronically in such a fashion that a D.C. null, or zero signal, will only appear at the input 16 to the stop circuit when the slide 26 or 27 is at the desired position. If the slide is off this position in one direction, a positive D.C. voltage appears in line 16; if it is off in the opposite direction, a negative D.C. voltage appears. This is analogous to measuring rods—either they are the correct length (zero), too long (positive) or too short (negative).

*Stop circuit general*

The stop circuit is designed so that when the D.C. error signal in line 16 is a positive signal of a value determined by the bias potentiometer 51, the relay 23 is energized. When the D.C. error signal is below this bias (negative) the relay 23 is deenergized. Relay 23 replaces LS9 switch of De Vlieg et al.

Thus the stop circuit is analogous to the limit switch of the patent. Either the swingers of relay 23 are contacted or relaxed, depending on the error indicated by the measuring equipment.

*Reversing.*—Since the stop circuit is electrical and overloading with a large error signal is not damaging, the machine can be on either side of the desired position at the start. The stop relay will be either energized or relaxed, depending on this direction, and this indicates to the motor controls which way to move. Obviously, with measuring rods, the machine can start only on one side of the desired position.

*Zero-offset.*—With zero-offset, the operator has the ability of setting any position in the machine as his zero reference. This can be any dimension, as well as the zero dimension that the operator dictates.

Stop circuit detail

With regard to the relay 35 in FIG. 1c, its coil is in parallel with the coil of X—Y relay 36 of FIG. 2, as shown. The purpose of this relay 35 is to switch potentiometer 33 out, and potentiometer 34 into, the circuit, whenever the X—Y relay 36 is energized.

The stop circuit consists of an amplifier stage 30 driving a trigger 31 which operates relay 23.

The amplifier stage 30 is a cathode-coupled phase inverter (or amplifier—see later comment) the gain of which is variable by means of a potentiometer 32 in the common cathode circuit. The signal at the plates of the two triode sections is out of phase; as one plate goes more positive, the other goes less positive.

The trigger 31 is a modified Eccles-Jordan circuit which is D.C.-driven at both grids. The term "trigger" is used here to describe a circuit which produces an abrupt output signal, in this case the sudden application of voltage across the coil of relay 23, when its input signal passes a certain critical voltage. The shape of the output signal is not dependent upon the shape of the input signal. When the grid of the first triode section of 31 is positive with respect to the grid of the second triode section of 31, the first section is conducting and the second section is cut off. When the grids of both sections approach the same voltage, the first section is cut off and the second section conducts. This action occurs very rapidly, since the two sections share a common cathode resistor and are plate-to-grid cross-coupled.

The grids terminate in armatures 98, 99 of relay 35 and are returned to ground 102 through potentiometer 33. Potentiometers 33 and 34 are adjustable to adjust the grid voltage to move the firing point of the trigger. When the trigger fires, it applies a current 50% in excess of the current required to operate the relay coil 23. This obtains fast and repeatable operation of the relay.

The use of balanced circuits as shown in the amplifier and trigger stages 30, 31 minimizes the effects of supply voltage variations.

The potentiometer 33 adjusts the stop position of the machine. However, when two axes of movement are required, as in this case, a separate adjustment for each axis is required. Therefore potentiometer 33 adjusts the Y axis, and 34 adjusts the X axis, independently.

The stop circuit consists of an amplifier stage 30 driving a trigger 31 which operates relay 23.

The amplifier stage 30 is a cathode coupled phase inverter the gain of which is variable by means of a potentiometer 32 in the common cathode circuit.

The trigger 31 is a modified Eccles-Jordan circuit which is D.C. driven at both grids. The Eccles-Jordan circuit as modified is not bi-stable.

A negative D.C. voltage on the error signal input 16 of FIG. 1c will be applied to the grid of the first section of amplifier 30. This negative grid voltage will tend to cut off this tube and the plate voltage will be high. Since this plate is resistively coupled to the grid of the first section of trigger 31, the first section of 31 will be conducting and the second section of 31 will be non-conducting. Relay 23 will have no voltage across its coil and will not be operated.

The second section of amplifier 30, being cathode-coupled to the first section, will be heavily conducting with a negative voltage on the grid of the first section. Its plate voltage will be low and since it is resistively coupled to the grid of the second section of trigger 31, will aid in keeping the second section of 31 cut off.

When the error voltage reaches the vicinity of zero volts, the plate voltage of both sections of amplifier 30 is approximately of equal voltage and the trigger will fire. Section 1 will then be non-conducting and section 2 will be fully conducting. There will now be a voltage drop across the coil of relay 23 and it will operate.

The single-phase transformer, plus loads at the bottom of FIG. 1c are the tube heaters and the transformer to supply the necessary heater voltages.

The difference between a cathode-coupled phase inverter and a cathode-coupled amplifier is a moot one as shown in the two referenced figures in Radiotron Designer's Handbook. Langford-Smith comments, "The circuit of Fig. 7.46 may also be used as a phase inverter." This is the circuit used as item 30 in FIG. 1c. See Radiotron Designer's Handbook, 4th edition, by Langford-Smith, pages 347–348 and Figs. 7.45 and 7.46; and Radio Engineering, 3rd edition, by Terman, page 302, Fig. 6–40e.

This action is accomplished by changing the grid bias values so that a D.C. voltage is required to keep the relay energized or de-energized, as contrasted to the usual Eccles-Jordan circuit which requires only a pulse to change its state. The grids terminate in armatures 98, 99 of relay 35 and are returned to ground 102 through potentiometer 33. Potentiometers 33 and 34 are adjustable to adjust the grid voltage to move the firing point of the trigger. When the trigger fires it applies a current 50% in excess of the current required to operate the relay coil 23. This obtains fast and repeatable operation of the relay.

The use of balanced circuits as shown in the amplifier and trigger stages 30, 31 minimizes the effects of supply voltage variations.

Operation and adjustment

A positive going D.C. voltage on line 16 will operate relay 23 in the vicinity of zero volts, the exact voltage of operation being determined by various positions of the swingers of potentiometers 33 and 34, as described later. In machine tool applications, this voltage would be obtained from the output of phase detector DA–1 and would be a D.C. representation of the system position error. The output of the DA–1 phase detector is D.C. The purpose of this unit is to convert the 10 kc. error signal into D.C. with the polarity of the D.C. corresponding to the phase sense of the 10 kc. signal. The stop circuit would be adjusted to stop the movement of the machine when it arrived at the command position.

The potentiometer 32 in the cathodes of the inverter stage 30 varies the detent of the circuit, i.e., the difference between the input voltage that causes the relay 23 to operate and the input voltage that causes this relay to release. When using positioning systems similar to the De Vlieg system this variable detent is valuable since it determines the distance of the final creep approach to a position.

The zero adjustment potentiometer 33, 34 in the ground return of the grids of trigger 31 makes it possible to adjust the value of the D.C. error signal at which the relay 23 operates, and in particular, the zero adjustment potentiometer can be adjusted to cause the relay 23 to operate at that value of the D.C. error signal which corresponds to a position in advance of the desired position, for example by the amount the machine will coast, e.g., .001", so that the relay 23 will operate in advance by the chosen amount, whereby the machine will coast to the desired position. If the coast distance of the machine changes due to wear of the ways, compensation can be made with the zero adjustment potentiometer. The potentiometer also allows the use of commercial tolerance components in the circuit.

The possibility of ambiguous operation of slide does not exist in this system because the error signals from the coarse and medium resolvers and the Inductosyn are such that they will always keep the switches SW-1, SW-2 thrown in one direction until the Inductosyn null is obtained. The distance required to go to an ambiguous null in the Inductosyn will be enough to require the electronic switch SW-2 to switch the error signal over to the medium resolver and in the same respect the distance required to go to an ambiguous medium null will be sufficient to require the electronic switch SW-1 to switch the error signal over to the coarse system. There is also an ambiguous coarse null. However, the machine is designed so that its length is less than half the length corresponding to one coarse cycle so that this ambiguous null is theoretically impossible to obtain.

Even if the slide does coast a distance greater than that corresponding to the pole cycle of any data element, the stop circuit is so arranged so that once it is energized from, say, a positive direction to a negative direction, it will not de-energize until the opposite, or a negative to a positive direction, occurs, i.e., the relay 23 will not relax until the machine reverses and goes back through zero again. The relay will remain de-energized with one polarity of the D.C. error signal, and will be energized with the opposite polarity. Since each side of zero position has its own definite polarity, the circuit functions as described.

To summarize the above, a D.C. error signal on a line 16 is developed by the system shown in FIG. 2 according to the positions of the resolvers in the data-zero offset units 5 and 6, the sliders 3 and 4 and the scales 1 and 2 relative to commands received from the stepping switch assembly 9. This D.C. error signal proceeds to the stop circuit, FIG. 1c, via wire 16 so that when it is reduced to zero, relay 23 operates, causing armatures 24 and 25 to move to alternate positions, to control the connection of lines 17 to 22 as above described. This replaces the action of switches 60 and 68 of FIG. 1A of De Vlieg 2,561,346. The signals then proceed to FIG. 1b and operate the machine in the same fashion as described in De Vlieg 2,561,346.

I claim:

1. A machine control system comprising means providing a D.C. error signal, a stop circuit comprising an amplifier stage having an input from said means, said amplifier stage comprising a cathode coupled phase inverter having a cathode circuit, a potentiometer in said cathode circuit for varying the gain of said amplifier stage, a D.C. driven trigger circuit having an input from said amplifier stage, a relay in the output circuit of said trigger circuit, said trigger circuit having grid circuits having a potentiometer for varying the grid voltage to move the firing point of said trigger circuit and thereby change the value of said D.C. error signal at which said relay operates, said trigger circuit when firing applying a current substantially in excess of the current required to operate said relay, said first mentioned potentiometer comprising means for adjusting the difference between the input voltage of said first means that causes said relay to operate and the input voltage thereof that causes said relay to release.

2. A machine control system according to claim 1 comprising a plurality of input means providing a D.C. error signal, a corresponding plurality of potentiometers in said grid circuits, and switching means for switching from one of said input means to the other and for correspondingly switching the control from one of said last potentiometers to the other.

3. A machine control system according to claim 1 in combination with a work support drive controlled by said relay.

4. A machine control system according to claim 2, each of said input means comprising the following; data elements geared together with the revolution scale of 10 to 1, a positional command input for said data elements, said data elements having alternative drives, one of which is derived from a machine element driven by a servo motor controlled by said data elements and the other of which is derived from a zero offset motor for offsetting the zero reference of said positional command; said switching means comprising means for operating one or the other of said drives.

References Cited in the file of this patent

UNITED STATES PATENTS

| | | |
|---|---|---|
| 2,577,147 | Oberman et al. | Dec. 4, 1951 |
| 2,620,400 | Snyders | Dec. 2, 1952 |
| 2,898,526 | Trousdale | Aug. 4, 1959 |